Sept. 20, 1949.                    J. R. RITCHIE                    2,482,213
                               SNOWPLOW STRUCTURE
Filed Aug. 12, 1944                                           5 Sheets-Sheet 2
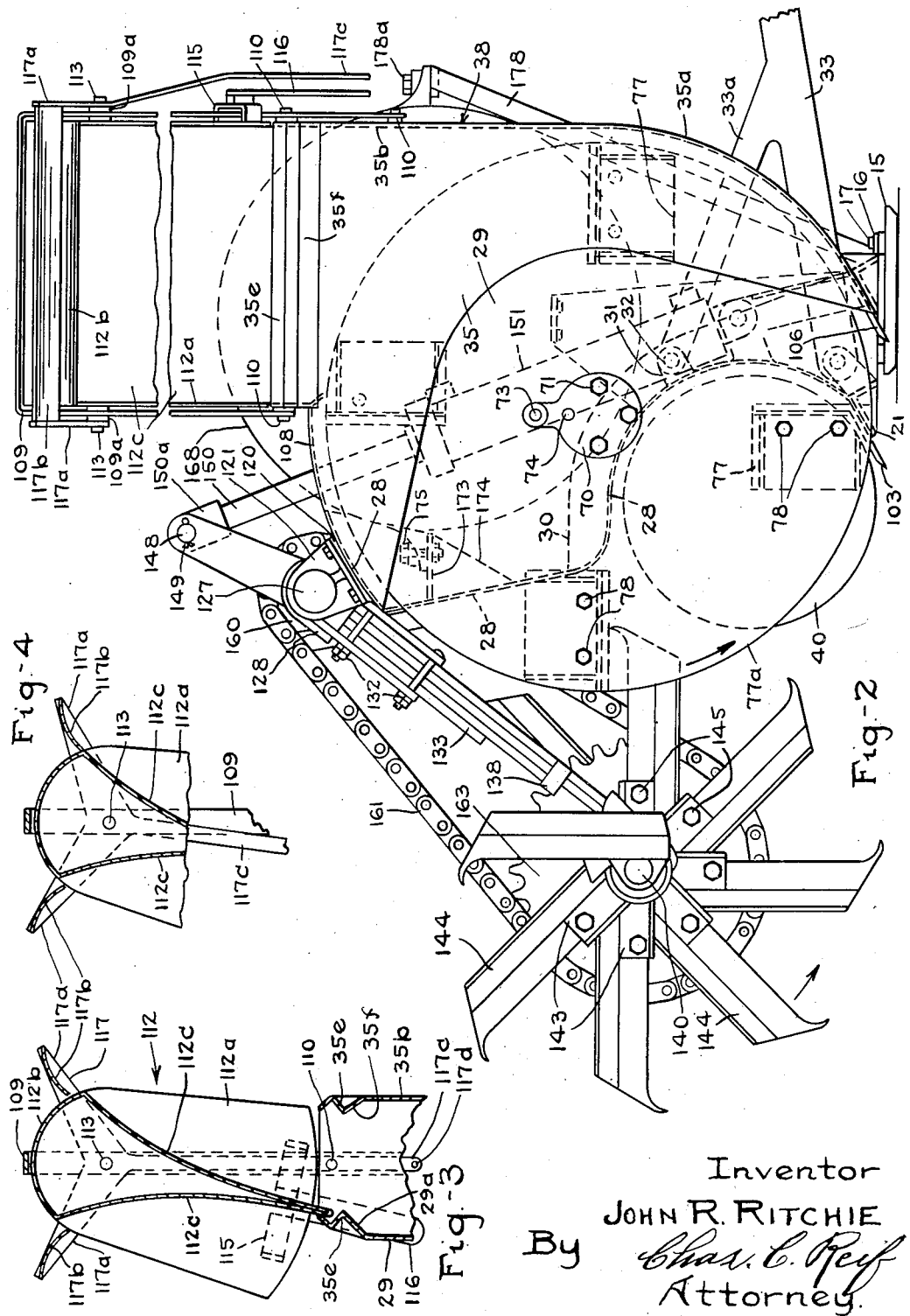
Inventor
JOHN R. RITCHIE
By Chas. C. Reif
Attorney.

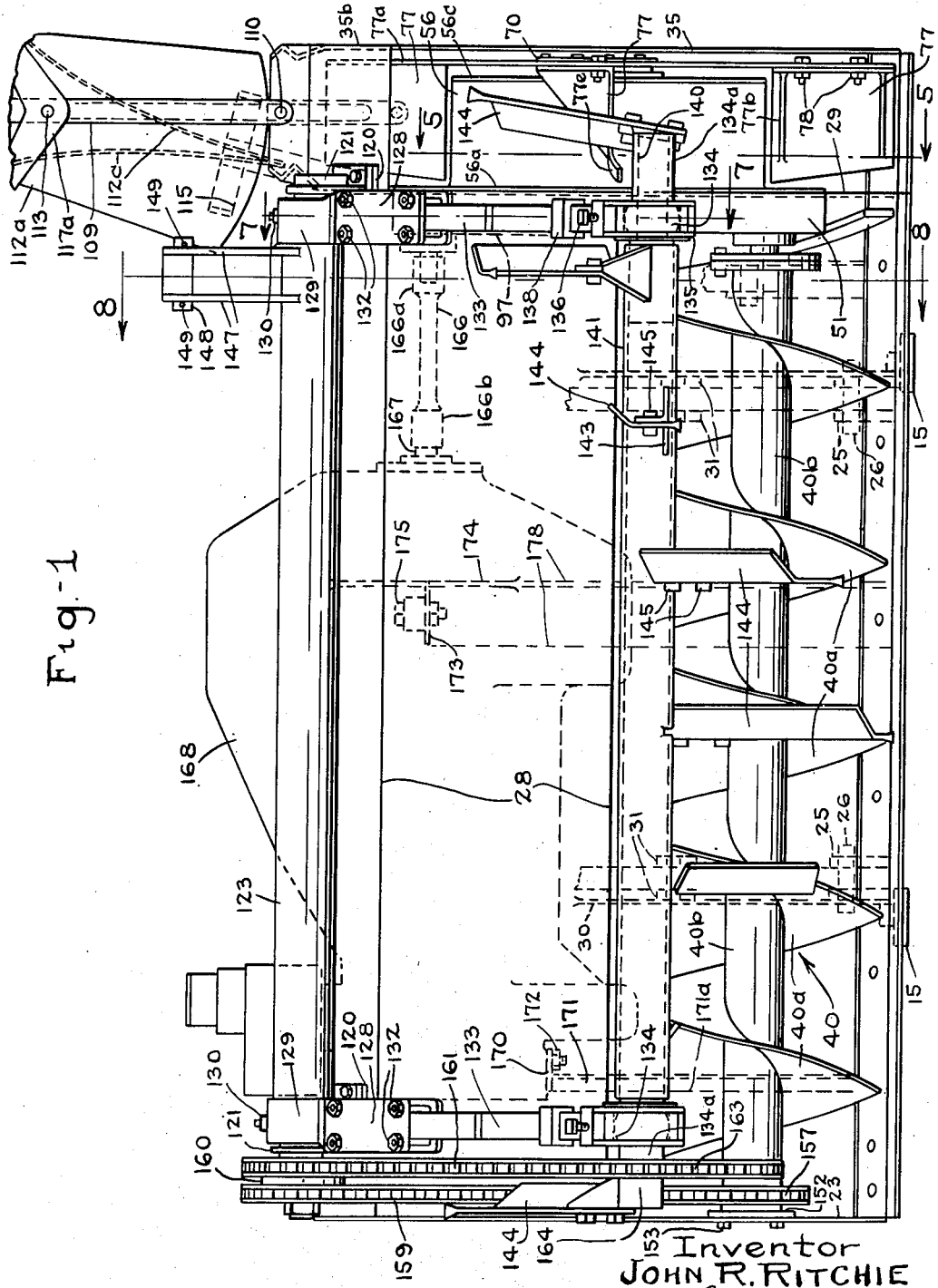

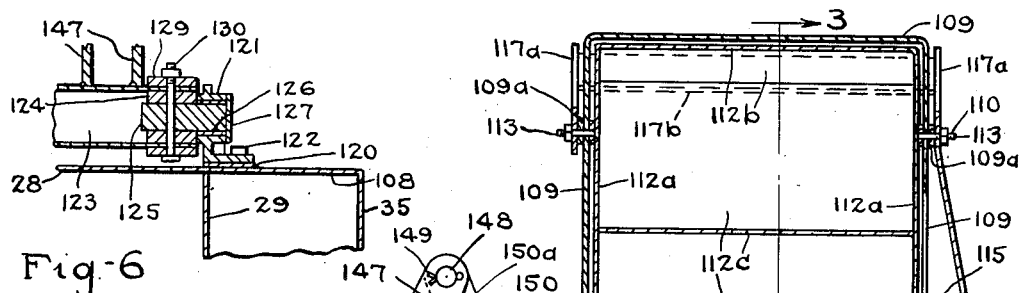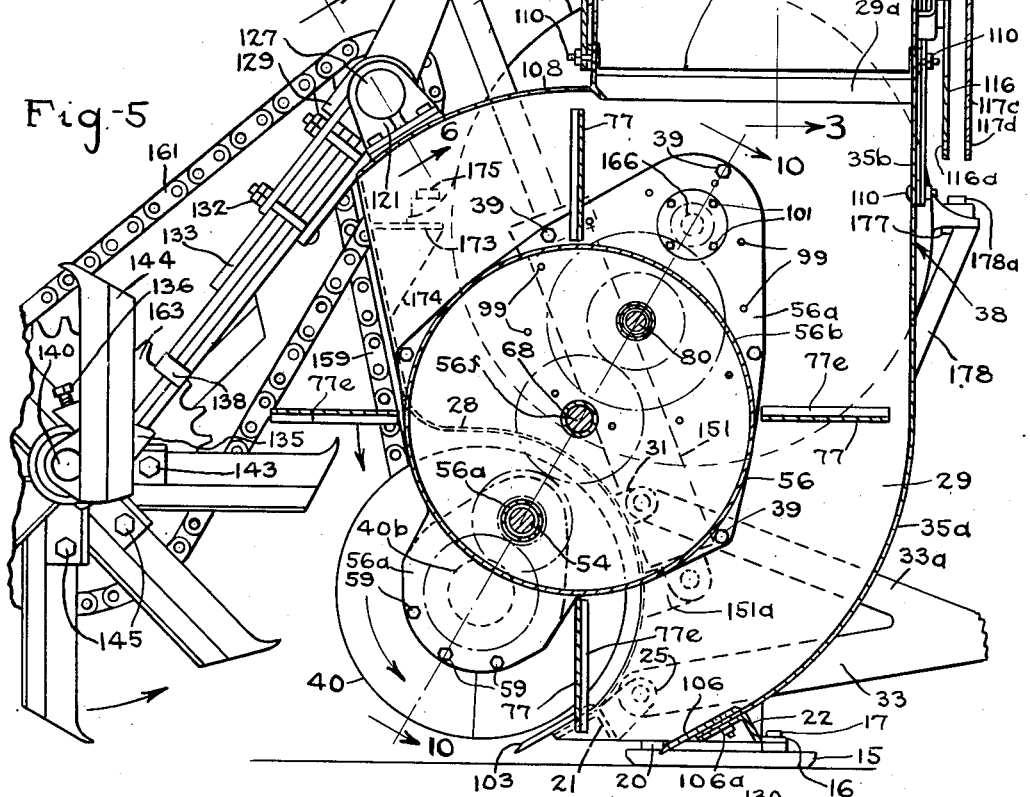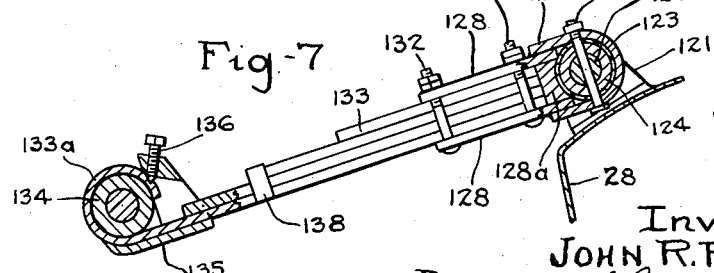

Sept. 20, 1949. J. R. RITCHIE 2,482,213
SNOWPLOW STRUCTURE
Filed Aug. 12, 1944 5 Sheets-Sheet 4

Inventor:
JOHN R. RITCHIE
By Chas. C. Reyf
Attorney.

Sept. 20, 1949.   J. R. RITCHIE   2,482,213
SNOWPLOW STRUCTURE
Filed Aug. 12, 1944   5 Sheets-Sheet 5

Inventor:
JOHN R. RITCHIE
By Chas. C. Reif
Attorney

Patented Sept. 20, 1949

2,482,213

UNITED STATES PATENT OFFICE 2,482,213

SNOWPLOW STRUCTURE

John R. Ritchie, Minneapolis, Minn.

Application August 12, 1944, Serial No. 549,151

13 Claims. (Cl. 37—43)

1

This invention relates to a snow plow of the general rotary type, constructed and arranged for clearing snow from highways and other places.

It is an object of this invention to provide an efficient snow plow which has means at its forward end and adjacent the ground for engaging snow and moving it transversely of said plow, said means extending throughout the full width of said plow, a chamber at one side of said plow and at one end of said means to which said snow is delivered, together with means for discharging the snow from said chamber.

It is another object of the invention to provide such a plow as set forth in the preceding paragraph in which said means is in the form of a rotary helical conveyor, the blades of which are quite thin or substantially sharp so that they will readily cut into and move the snow.

It is an object of the invention to provide such a snow plow as set forth in the preceding paragraphs, the same also having a rotating rake ahead of said means or conveyor, said rake comprising arms spaced longitudinally thereof and preferably arranged in helical relation.

It is still further an object of the invention to provide such a snow plow as above set forth in which said rotary rake is mounted on resilient arms together with means, preferably power actuated, for swinging said arms to raise and lower said rake.

It is also an object of this invention to provide a snow plow having means, such as a helical conveyor, extending across the front thereof for moving snow laterally, a chamber to which said snow is delivered, a chute leading from said chamber, a rotor in said chamber for discharging said snow and a motor, preferably of the internal combustion type, mounted on said plow in the rear of said conveyor and at one side of said chamber and chute together with means connecting said motor, rotor and conveyor for driving said rotor and conveyor.

It is still another object of the invention to provide a snow plow comprising a means extending across the front of the plow, preferably in the form of a helical conveyor, for engaging the snow and moving it laterally, a chamber to which said snow is delivered, a rotor in said chamber for discharging snow therefrom, a motor mounted on said plow and gearing connecting said motor, said rotor and conveyor for driving the latter, said gearing being very compactly disposed and a large portion thereof being disposed within said rotor.

Another object of the invention is to provide

2 a rotor for a snow plow having spaced circumferentially arranged blades with means at one side thereof connecting said blades, said blades being spaced from the axis of said rotor, and a gear housing disposed in said rotor between the inner ends of said blades and containing shafts and gearing for driving said rotor and other elements of said plow.

These and other objects and advantages of the invention will be fully set forth in the following description made in connection with the accompanying drawings in which like reference characters refer to similar parts throughout the several views and in which:

Fig. 1 is a view in front elevation of said snow plow, certain parts being indicated in dotted lines;

Fig. 2 is a view in end elevation as seen from the left hand end of said plow looking forwardly;

Fig. 3 is a vertical section taken substantially on line 3—3 of Fig. 5 as indicated by the arrows;

Fig. 4 is a partial section similar to Fig. 3 showing the parts in different positions;

Fig. 5 is a view partly in side elevation and partly in vertical section taken on line 5—5 of Fig. 1 as indicated by the arrows;

Fig. 6 is a view taken on line 6—6 of Fig. 5 as indicated by the arrows;

Fig. 7 is a vertical section taken on line 7—7 of Fig. 1 as indicated by the arrows;

Figure 8:
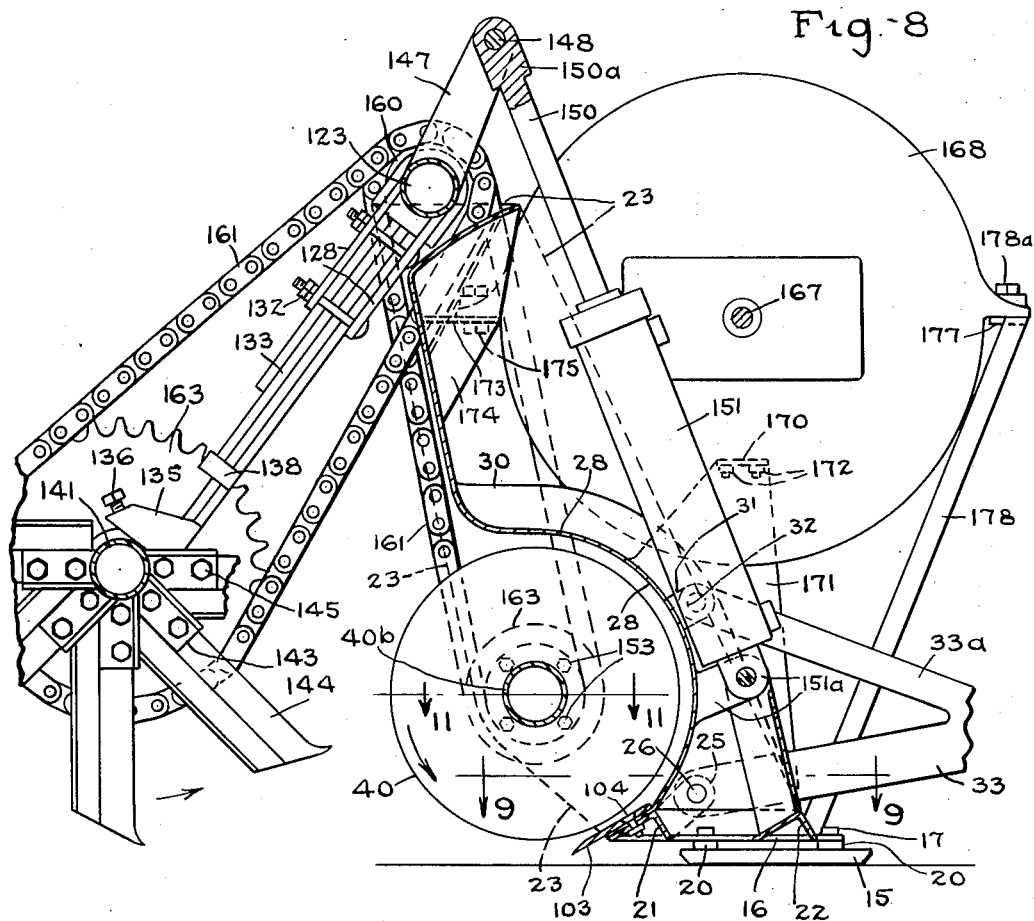
Fig. 8 is a vertical section taken on line 8—8 of Fig. 1 as indicated by the arrows.
Figure 9:
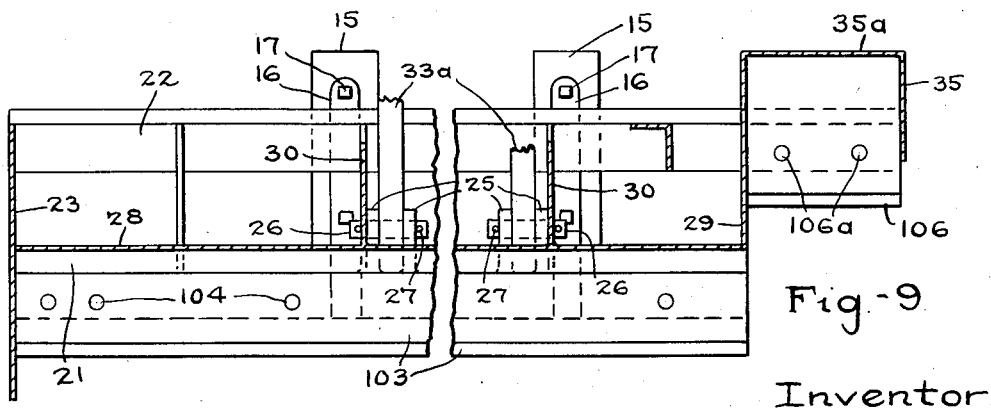
Fig. 9 is a horizontal section taken on line 9—9 of Fig. 8 as indicated by the arrows.

Referring to the drawings a snow plow is shown having laterally spaced supporting shoes 15. Shoes 15 have secured thereto and extending longitudinally thereof members or plates 16 secured by headed bolts 17. Spacing washers 20 are disposed between plates 16 and shoes 15. Secured to the plates 16 and extending transversely of the plow are elongated angles 21 and 22. Angles 21 and 22 are disposed with their angles facing downwardly and are set into openings in plates 16 and welded thereto. Angles 21 and 22 extend substantially the full width of the plow and are secured at one side thereof to a vertical end plate 23 in any suitable manner as by welding. End plate 23 is at the right hand side of the plow. Angle 21 has secured to the upper part of its rear side spaced pairs of lugs 25 (see Figs. 1, 8 and 9). Lugs 25 are apertured to receive pins 26 which will be held in place lengthwise by any suitable means such as cotter pins 27. Pins 26 extend through the apertured forward ends of bars 33 which constitute part of the pushing and lifting means of the plow. A plate 28 is provided having a lower semicylindrical portion and a forwardly and upwardly projecting portion terminating in a curved portion extending upwardly and rearwardly. Plate 28 has its lower front end secured to the top of the front side of angle 21 and extends transversely of the plow, the same being secured at its other end by welding to end plate 23. Said plate 28 is secured at the left hand end of the plow to a plate 29 disposed in a vertical plane. Plates 30 disposed in vertical planes extend around the outer side of plate 28 (see Figs. 1, 8 and 9). Plates 30 are disposed adjacent the remote sides of the endmost lugs 25 as shown in Figs. 1 and 9 and are welded to said lugs and to plate 28. Lugs 31 spaced transversely of the plow, are secured to the rear of plate 28, said lugs being arranged in pairs and aligned vertically with the lugs 25. The endmost ones of lugs 31 are adjacent and secured to the plates 30. Lugs 31 are apertured to receive pins 32 which extend through the apertured ends of bars 33a forming part of the pushing and lifting means of the plow and which may be connected to bars 33. As shown in Fig. 9, plate 29 is in line with the left hand end of angle 21. Angle 22 extends beyond plate 29 to another end plate 35 which is at the left hand end of the plow.

Figures 10, 11:
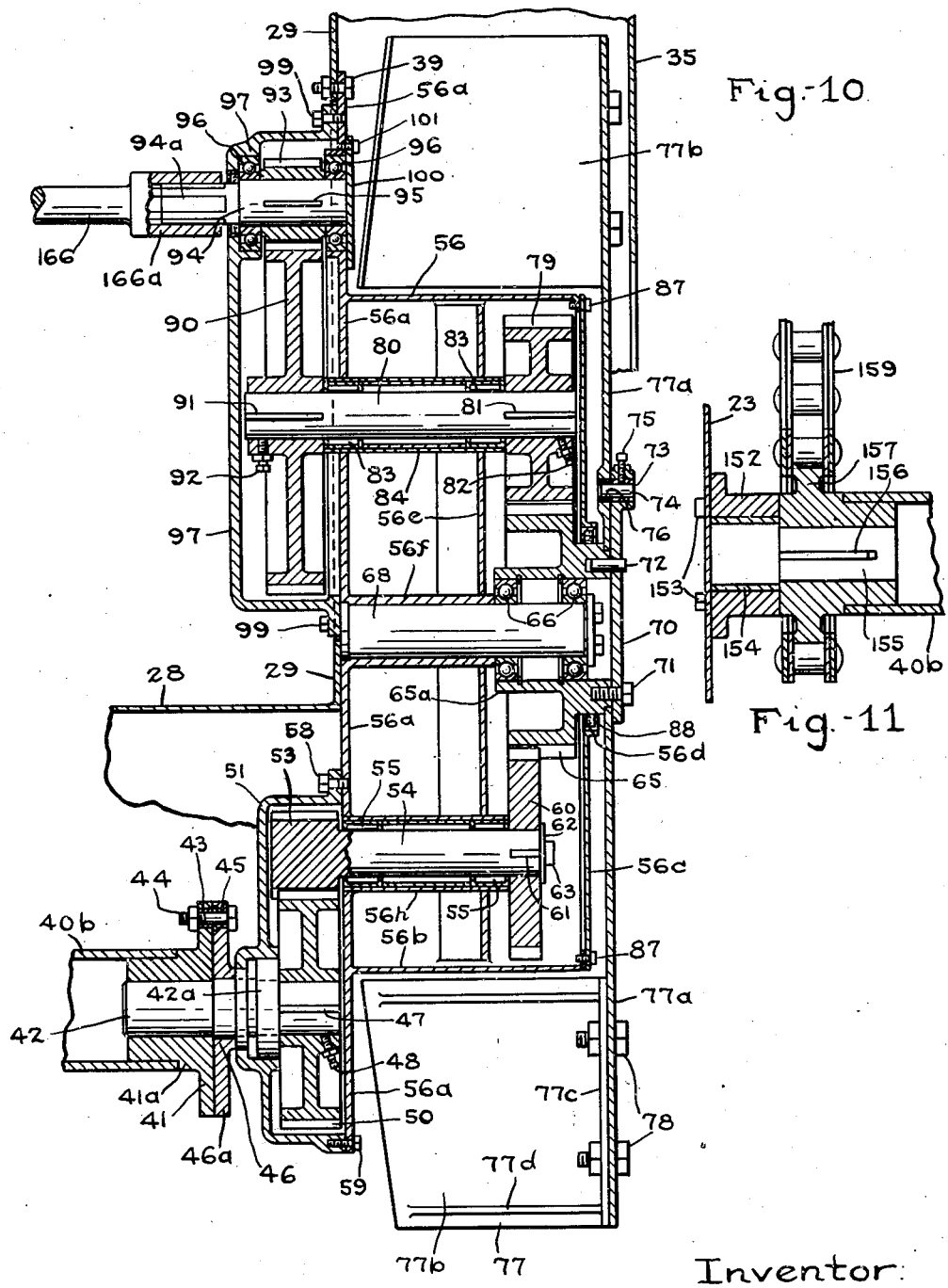
Fig. 10 is a substantially vertical section taken on line 10—10 of Fig. 5 as indicated by the arrows.
Fig. 11 is a horizontal section taken substantially on line 11—11 of Fig. 8 as indicated by the arrows.

Disposed within and coaxially with the semi-cylindrical portion of casing 28 is a conveyor 40. While this might take various forms, in the embodiment of the invention illustrated it is shown as a helical conveyor having a helical blade 40a secured to a central shaft 40b which is illustrated as in the form of a tube. The semi-cylindrical portion of plate 28 thus forms a casing for and cooperates with conveyor 40. Conveyor 40 engages the snow and moves the same laterally. It will be noted that conveyor 40 extends throughout the entire width of the plow. The helical blade 40a is made of a comparatively thin plate so that it is rather sharp and cuts into the snow very efficiently. At the left hand end of the plow which is at the right hand side of Fig. 1, the tube or shaft 40b is secured in any suitable manner as by welding to the hub 41a of a flanged driving member 41. Member 41 is bored to receive one end of a shaft 42. The flange of member 41, which is cylindrical in form, is provided with an aperture adjacent its edge in which is disposed a bushing or thimble 43. A headed and nutted bolt 44 passes through member 43 and through a flanged bushing or thimble 45 secured in an aperture in the flange 46a of a driving member 46 secured in any suitable manner to shaft 42. Shaft 42 has a reduced end portion to which is secured by the key 47 and a screw 48 a spur gear 50. A bearing 42a is disposed in a cylindrical bore of a gear casing 51 and shaft 42 is journaled in said bearing. Gear 50 meshes with a spur pinion 53 which is secured to a shaft 54 journaled in spaced bearings 55 which are illustrated as roller bearings. Bearings 55 are carried in a tubular portion or sleeve 56h of a gear casing 56. Gear casing 56 has a plate 56a at its left hand side as shown in Fig. 10, and gear casing 51 above referred to has a flange at its top secured to plate 56a by the headed screws 58. Casing 51 at its lower side has a thickened portion or hub threaded to receive a headed screw 59 passing through plate 56d and thus securing casing 51 thereto. Shaft 54 has secured to its end opposite pinion 53 a spur gear 60 shown as secured to shaft 54 by the key 61. A washer 62 engages the end of spur gear 60 and is held in place by a headed screw 63 threaded into the end of shaft 54. Gear 60 meshes with a gear 65 having a hub 65a in which are disposed bearings 66, illustrated as ball bearings, and which are arranged to receive a shaft 68 so that gear 65 is journaled on bearings 66 to rotate about shaft 68. Gear 65 is connected to a plate 70 by spaced headed screws 71 and also by a dowel pin 72 extending into a bore in hub 65a. Plate 70 has a boss adjacent its edge bored to receive a bushing 73 through which extends a frangible shear pin 74 held in plate 70 in bushing 73 by a set screw 75. Pin 74 extends into a small bushing or thimble 76 disposed in the bore of a boss formed on a circular plate 77a. Plate 77a forms one side of a rotor or impeller 77 which comprises a plurality of circumferentially spaced blades 77b. Blades 77b have flanges 77c secured to plate 77a in any suitable manner as by the headed bolts or rivets 78 and also have reinforcing ribs 77d extending thereacross parallel to shaft 68, said ribs extending from flange 77c and disposed adjacent the inner and outer edges of blades 77b. Blades 77b have forwardly projecting curved portions 77e as shown in Fig. 1. It will be seen that plate 70 is driven by gear 65 and that rotor 77 is driven through the pin 74 by plate 70.

Gear 65 meshes with a gear 79 secured to a shaft 80 by the key 81 and screw 82. Shaft 80 is journaled in spaced bearings 83 shown as of the roller type and carried in a sleeve or tube 84 secured in plate 56a in any suitable manner as by welding. Tube 84 is also secured to a channel member 56e in any suitable manner as by welding, which channel member extends vertically diametrically of shaft 68 and is connected at its ends to the cylindrical wall 56b in any suitable manner as by welding. Cylindrical wall 56b is secured at its left hand end as shown in Fig. 10, to the plate 56a in any suitable manner as welding and at its right hand end is secured to a circular plate 56c. While plate 56c could be secured in various ways, in the embodiment of the invention illustrated cylinder or gear casing wall 56b is provided with an inturned radial flange tapped to receive circumferentially spaced headed screws 87 extending through plate 56c and connecting the same to the cylindrical wall 56b. Plate 56c is provided with an axial opening about which extends an outwardly projecting cylindrical flange 56d and a sealing washer 88 is disposed within flange 56d and engages the inner wall thereof and also the periphery of the outer part of the hub 65a. Shaft 68 is also disposed and secured in a hub or sleeve 56f secured at one end to plate 56a in any suitable manner as by welding and also passing through and being secured in a bore in the web of channel 56e in any suitable manner as by welding. It will be seen that casing 56 forms a gear housing which encloses gears 60, 65 and 79 and also has sleeves or tubes for shafts 54, 68 and 80. It will also be noted that gear casing 56 is disposed within the rotor 77 and between the inner ends of blades 77b thereof. Said shafts and gears are also disposed within the rotor 77 and a very efficient and compact structure is thus provided.

A gear 90 is secured to the other end of shaft 80 by means of key 91 and screw 92. Gear 90 meshes with a pinion 93 secured to a shaft 94 by means of a key 95. Shaft 94 is journaled in bearings 96, shown as of the ball bearing type, carried in a cylindrical bore formed in a gear casing 97. Gear casing 97 encloses gear 93, a portion of shaft 94, gear 90 and a portion of shaft 80. Said casing 97 has flanges thereon through which extend headed screws 99 tapped into plate 56a. Plate 56a has an opening therethrough adjacent bearings 96, which opening is covered by a small plate 100 secured to plate 56a by the headed screws 101. The end of plate 28 at the left hand end of the plow and at the right of Fig. 1 is secured to plate 29 in any suitable manner as by welding. Gear casing 97 is provided with an opening for the passage of shaft 94 and said shaft has a projecting end 94a provided with circumferentially spaced splines or ribs.

A blade 103 is secured above the lower end of plate 28 above angle 21 and will be secured to plate 28 and angle 21 in any suitable manner as by the headed countersunk screws 104. Blade 103 has a bevelled or sharpened forward edge. The plate 28 at the end shown at the right of Fig. 1 opens into a chamber formed by plates 29, 56a and the end plate 35. The end plate 77a of rotor 77 also closes the outer end of said chamber. The snow is moved laterally by conveyor 40 into this chamber and is engaged and discharged from the chamber by the rotor 77. End plate 35 has a semi-cylindrical portion 35a extending parallel to the circumference or peripheral edge of plate 77a, the lower end of said portion 35 being secured to the top of angle member 22 (see Fig. 2). Blade 106 is secured to the top of said lower end of plate 35a over angle 22 and the same will be secured in any suitable manner as by countersunk bolts 106a. Plate 106 is of a length to extend across the chamber in which rotor 77 is disposed. The portion 35a of plate 35 merges into a vertical portion 35b which forms the rear side of a discharge chute for the snow and designated as 38. Plate 29 previously referred to forms the inner side wall of said discharge chute and this is secured to the upper end of plate 56a by the headed and nutted screws 39 (see Fig. 10). The lower edge of plate 29 is horizontal and at the bottoms of angles 21 and 22. Said plate extends along the rear of plate 28 to plate 108 and above plate 108 forms the side of chute 38 (see Fig. 5). Plate 56a is secured to plate 29 by the headed screws 39. The plate portions 35b and 29 which form the inner and outer sides of said discharge chute are provided with the V-shaped portions 35e having the inner sides of their angles facing each other and carried on converging portions 35f and 29a. As shown in Fig. 5 a curved plate 108 which could be part of plate 35, extends from the forward side of said discharge chute forwardly to and is secured to the upper end of plate 28. Plate 108 forms a top wall for the chamber in which the rotor 77 moves and extends parallel to the peripheral edge of plate 77a.

A U-shaped member or yoke 109 has sides extending along the front and rear sides of said discharge chute and secured thereto by the headed countersunk bolts 110. A member 112 has forward and rear walls or plates 112a between which extends the semi-cylindrical top wall or portion 112b. As shown in Fig. 3, the sides of the walls 112a diverge slightly from the ends of portion 112b with which they are tangent and the lower edges of walls 112a are on a curved concentric with pivot members 113 journaled in boss 109a formed on the sides of the yoke member 109. Pivot members 113 are shown as nutted bolts having their heads countersunk in the walls 112a. Member 112 has plates 112c extending between the walls 112a, which plates are in contact at their lower ends along a line which is a median of walls 112a. Plates 112c diverge upwardly from their lower ends and have their upper ends disposed respectively at the outer ends of the semi-cylindrical portion 112b. One member 112a has secured thereto a U-shaped or yoke plate 115 through which yoke 109 passes. A handle or operating link 116 is secured to yoke 115 and depends at one side thereof. Member 112 can be swung by movement of member 116 and while this might be done by hand, in practice member 116 is preferably operated by power and is provided with an aperture 116a for the attachment of a suitable operating member. Another member 117 is pivoted on pivots 113 and has diverging arms 117a disposed at the outer sides of member 112. Curved plates 117b extend between the arms 117a at each side of member 112 as shown in Figs. 3 and 4. Member 117 has a depending operating member 117c, which like member 116, is in practice operated by power and is apertured at 117d for the connection of an operating member. Plates 117b thus move with member 117 when it is swung and can be moved to different positions in relation to the plates 112c for deflecting snow as shown in Figs. 3 and 4.

Plate 28 is provided with bosses 120 to which are secured bearing brackets 121 which are secured by headed screws 122. A shaft 123 of tubular form has disposed in its end portions sleeves 124 bored to receive respectively stub shafts 125 journaled in bushings 126 disposed in bearings 121. A plate 127 is secured to the outer end of bearing 121. Shaft 123 is embraced adjacent each of its end portions by the arms of a yoke 129 having substantially parallel and forwardly directed arms. A headed and nutted bolt 130 extends diametrically through shaft 123, member 124 and yoke 129 as shown in Fig. 6. The structure shown in Fig. 6 is duplicated at each end of shaft 123. Yoke 129 has secured to the arms thereof in any suitable manner as by welding, bars 128 extending forwardly in parallel relation and connected by four headed and nutted bolts 132 which are disposed at either side of the layers or leaves of a cantilever spring 133 extending forwardly in the direction of yoke 129 and have one of the leaves thereof, namely, the lower and longest one, formed into a semi-cylindrical portion 133a in which is disposed a member 134 having a periphery which is partly spherical. A block 128a is disposed between bars 128 at their inner ends and formed to fit against shaft 123. A yoke 135 (see Figs. 1 and 7) surrounds the end of said lower leaf of spring 133 and has a transversely extending top portion in which is threaded the set screw 136 which engages portion 133a. Spring 133 has clips 138 extending thereabout adjacent its outer end. Secured to the members 134 and projecting at the outer sides thereof are bearing portions 134a in each of which is journaled a stub shaft 140 having an enlarged end disposed in and secured in a tubular shaft 141. Shaft 141 and shaft 140 can be connected in any suitable manner as by welding. It will be seen from the above description that the springs 133 thus carry the bearing members 134 which in turn supports shafts 140 and 141; shafts 140 being rotatable in bearings 134. Secured to shaft 141 and at equal spaced intervals longitudinally thereof are angle members 143, said members being secured in any suitable manner as by welding. Secured to each of the members 143 and projecting outwardly therefrom is an arm 144. Arms 144 are of angular form in transverse cross section, the flanges thereof meeting at an obtuse angle as shown in Fig. 1. Arms 144 are secured to members 143 by the headed rivets 145. The outer ends of arms 144 as shown in Figs. 2 and 5, project forwardly to form substantially pointed teeth having curved upper surfaces. An arm 147 projects upwardly from and is secured to shaft 123 in any suitable manner as by welding (see Fig. 6), said arm being apertured to receive a connecting pin 148 held in place in any suitable manner as by cotter pins 149. Arm 147 is of channel form and receives between the sides thereof a head 150a of a connecting rod 150 through which pin 148 also passes. Connecting rod 150 will be connected to the piston in a hydraulic cylinder 151, pivoted on a lug 151a secured to plate 28, which piston (not shown) will be operated by suitable controls so that arm 147 can be swung to raise and lower the springs 133, and thus shaft 141 carried thereby. Shaft 141 and the members 143 and arms 144 form a rotating rake or breaker adapted to engage the snow and direct it downwardly and toward conveyor 40. The arms 145 are progressively disposed in spaced relation circumferentially so as to be substantially in helical arrangement (see Fig. 1).

As above described, shaft 40b is driven. Secured to the end plate 23 at the right hand side of the machine and at the left hand side of Figs. 1 and 9, is a bearing member 152 which will be secured to said plate 23 by the headed screws 153. A bushing 154 is disposed in a central bore of member 152 in which is journaled a stub or counter shaft 155. Shaft 155 has secured thereto in any suitable manner as by key 156 a sprocket 157. Sprocket 157 has a hub which has a portion projecting into and secured to the end of shaft 40b in any suitable manner as by welding. A chain 159 runs over sprocket 157 and over a double sprocket 160 rotatable on the outer end of shaft 123. Another chain 161 runs over sprocket 160 and also runs over sprocket 163 secured to a stub shaft 164 extending into and secured to shaft 141 in any suitable manner as by welding. From the above description it will be seen that the rotating rake comprising arms 144 is thus driven from the conveyor shaft 40b.

The portion 94a of shaft 94 projecting from the gear housing 97 is received in the splined head 166a of a shaft 166 which at its other end is provided with another splined head 166b embracing the splined end of the crank shaft 167 of a motor 168. Shaft 166 can move a short distance longitudinally relatively to shafts 94 and 167. Motor 168 is preferably of the internal combustion type and is conveniently and efficiently supported on the frame of the plow in the rear of and above conveyor 40 and at one side of the chamber in which rotor 77 is disposed. Motor 168 has a support formed by a plate 170 adjacent the right hand end of the motor, which plate is supported upon a plate 171 extending upwardly from angles 21 and 22 and secured at one side to plate 28 in any suitable manner as by welding. Plate 171 has a flange 171a extending at an angle thereto. Motor 168 will be secured to plate 170 by suitable nutted bolts 172. Motor 168 has a forward support adjacent the center of the plow formed by a plate 173 secured to a plate 174 extending substantially at right angles to and secured to plate 28 as by welding. Bolts 175 secure motor 168 to support 173. A rear support for motor 168 is provided and is also located substantially centrally longitudinally of the plow and comprises a plate 177 secured to and projecting laterally from an angle member 178 which extends upwardly and rearwardly from angle 22. Motor 168 is secured to plate 177 by the headed bolts 178a. The plate 23 at the right hand end of the plow extends upwardly substantially to shaft 123 as shown in Fig. 8. The rear end of plate 23 is in a straight line extending from the rear upper end of plate 28 to the rear side of angle member 22.

In operation, the plow will be supported upon the shoes 15 and will be propelled forwardly by some vehicle such as an automotive truck having means connected to the members 27 and 33. Motor 168 will be operated and this will, through gears 93, 90, 79 and 65, rotate the impeller or rotor 77. The conveyor 40 will be rotated through gears 60, 53 and 50 and said impeller will engage the snow as the plow moves forwardly. The snow will move between the blades of conveyor 40 and plate or moldboard 28 and will be moved laterally into the chamber in which impeller or rotor 77 is disposed. Rotor 77 is rotated as indicated by the arrows in Fig. 5 and the snow will be engaged by the blades 77b and moved rearwardly below the axis of said impeller and around casing wall 56b and thence upwardly into chute 38. The snow will be discharged at one side or the other of said chute, either inwardly or outwardly depending on the position of member 112. When member 112 is disposed as shown in Fig. 3, the snow will be thrown outwardly from the plow. The top of the shower or mass of snow being discharged will be determined by the contour of the plates 112c. Should it be desired to direct the snow more in a downward direction, the member 117 will be moved to bring one of the vanes or blades 117b into alignment with one of the plates 112c as shown in Fig. 4. This will tend to keep the shower of snow at a lesser height. As described, members 112 and 117 can be moved by means of the members 116 and 117c and this is preferably done by a power means. In some cases the snow tends to stick or hang in elevated position instead of dropping down in front of conveyor 40. This is particularly true in plowing through drifts. In such cases the rake or breaker formed by the arms 144 can be used. This is rotated as described, from the outer end of conveyor 40 through the chains 159 and 161. Said rake is rotated in direction of the arrow shown in Fig. 5 so that the arms below the axis thereof move toward the conveyor 40. The snow is thus broken up and given some impulse toward said conveyor. The rake can be operated at different heights and, where light snow or snow not having much depth is being plowed, the same can be raised to be in inoperative position. As stated, said rake is raised by operating a plunger in piston 151, which swings arm 147 and thus raises the arms 133. Arms 133 form cantilever springs and thus give some yielding and flexibility to the rake. The conveyor 40 is driven through the bolt 44 which can act as a shear pin so that parts will not be damaged if some unusual obstruction should be encountered by the conveyor. The rotor 77 is also driven through the shear pin 74 which pin will shear and prevent damage to the rotor if some unusual object should be encountered thereby. The motor 168 is very conveniently and efficiently mounted on the plow and a plow having much greater power is produced by having a separate motor for driving the conveyor and other parts than where such parts are driven from the propelling vehicle. The driving gears are all completely housed in the gear casings 51, 56 and 97. The arrangement of gear casing 56 within the rotor gives a very compact and efficient structure. The gears are thus nicely protected against snow, moisture or dirt and this result is aided by the use of the sealing ring 88. The conveyor 40 extends across substantially the whole front of the plow and is of such proportions as to have large capacity and easily handle the snow encountered. The impeller 77 also engages the snow as the plow is moved forwardly and also functions in the snow removal operation. The blades 77b engage the snow and sweep it rearwardly and discharge it through chute 38.

From the above description it will be seen that I have provided a compact, efficient and very durable snow plow and one which will have large capacity. The parts of the plow are efficiently driven by the motor carried on the plow, which will provide ample power for all circumstances. The parts are strong and the welded construction used on the frame and other parts assures durability for the very rough usage to which these plows are subjected. It is apparent that the device will have a high degree of utility for the purpose intended.

It will, of course, be understood that various changes may be made in the form, details, arrangement and proportions of the parts without departing from the scope of applicant's invention, which generally stated, consists in a device capable of carrying out the objects above set forth in the parts and combinations of parts disclosed and defined in the appended claims.

What is claimed is:

1. A snow plow having in combination, a frame, a helical conveyor adjacent the front of said plow, a chamber at one side of said plow to which said conveyor delivers, a chute leading upwardly from said chamber, a rotor in said chamber for discharging snow therefrom, said rotor having circumferentially spaced blades spaced from the axis of said rotor, a gear casing disposed within said impeller between the inner ends of said blades and gearing in said gear casing for driving said rotor and conveyor from said motor.

2. A snow plow having in combination, a chamber, means for delivering snow to said chamber, an impeller in said chamber for discharging snow from said chamber, a shaft on which said impeller is journaled, said impeller having blades spaced radially from said shaft and means connecting said blades at one side thereof, a motor for driving said impeller, a second shaft extending parallel to said shaft between the same and said blades, gearing connecting said motor and second shaft, a gear secured to said impeller, a gear meshing with said gear and secured to said second shaft, a third shaft between said first mentioned shaft and blades, gearing connecting said first mentioned gear and third shaft and gearing connected to said third shaft for driving said first mentioned means.

3. A snow plow having in combination, a rotor for discharging snow comprising circumferentially spaced blades spaced from its axis, a plate at one side of said rotor and blades to which said blades are connected, a shaft on which said rotor is journaled, a gear secured to said rotor axially thereof at said side of said rotor, a second gear meshing with said gear, said gears being disposed radially between said blades and a shaft for driving said second gear extending parallel to said first mentioned shaft and extending between the inner ends of said blades said plate being disposed substantially at right angles to the axis of said first mentioned shaft and closing said side of said rotor.

4. A snow plow having in combination, a rotor to which snow is delivered having circumferentially spaced blades having inner ends spaced radially, a plate at one side of said rotor connecting said blades and closing said side of said rotor, a shaft on which said rotor is journaled and a gear casing disposed within said rotor at one side of said shaft disposed between the inner ends of said blades and having plates forming the side walls thereof, the outer one of which is spaced inwardly a short distance from said first mentioned plate for housing gearing for driving said rotor.

5. A snow plow having in combination, a rotor for discharging snow comprising circumferentially spaced blades spaced from its axis and means at one side of said rotor connecting said blades, a shaft on which said rotor is journaled, a gear secured to said rotor axially thereof at said side of said rotor, a second gear meshing with said gear, said gears being disposed radially between said blades and a shaft for driving said second gear extending parallel to said first mentioned shaft and extending between the inner ends of said blades, a conveyor for delivering snow to said rotor, a third shaft for driving said conveyor, a third gear secured to said third shaft, a pinion meshing with said third gear, a fourth shaft secured to said pinion and extending parallel to said first mentioned shaft between the inner ends of said blades and a fourth gear secured to said fourth shaft and meshing with said first mentioned gear and disposed between the inner ends of said blades.

6. A snow plow having in combination, a rotor for discharging snow comprising circumferentially spaced blades spaced from its axis and means at one side of said rotor connecting said blades, a shaft on which said rotor is journaled, a gear secured to said rotor axially thereof at said side of said rotor, a second gear meshing with said gear, said gears being disposed radially between said blades, a shaft for driving said second gear extending parallel to said first mentioned shaft and extending between the inner ends of said blades, a conveyor for delivering snow to said rotor, a third shaft for driving said conveyor, a third gear secured to said third shaft, a pinion meshing with said third gear, a fourth shaft secured to said pinion and extending parallel to said first mentioned shaft between the inner ends of said blades and a fourth gear secured to said fourth shaft and meshing with said first mentioned gear and disposed between the inner ends of said blades and a gear casing enclosing said gears and shafts and having a major portion thereof disposed between the inner ends of said blades.

7. A snow plow having in combination, a chamber, means for delivering snow to said chamber, an impeller in said chamber for discharging snow from said chamber, a shaft on which said impeller is journaled, a plate at the inner side of said impeller, a second plate spaced outwardly from said plate and disposed within said impeller, sleeves supported by said plates at each side of said shaft, bearings in said sleeves, a pair of shafts journalled respectively in said bearings, gears carried by one of said pair of shafts for driving said impeller, gears carried by the other of said pair of shafts for driving said first mentioned means and a gear secured to said impeller and meshing with certain of said gears secured to said pair of shafts.

8. The structure set forth in claim 7, said impeller having radially spaced blade-forming plates and a casing disposed between the inner sides of said blade-forming plates enclosing said gears and secured to said first mentioned plates.

9. A snow plow having in combination, a frame at one side of said plow, an impeller in said chamber for discharging snow therefrom, a conveyor for delivering snow to said chamber, said conveyor having a hollow central shaft, a stub shaft at one end of said shaft, a gear secured to said stub shaft for driving the same from said impeller, means connecting said stub shaft and said conveyor shaft, a second stub shaft secured to the other end of said conveyor shaft and supporting the same, a sprocket secured to said second stub shaft, a countershaft, a double sprocket on said countershaft, a chain connecting said first mentioned sprocket and said double sprocket, a rotatable rake disposed in front of said conveyor, a sprocket secured to said rake and a chain connecting said double sprocket and last mentioned sprocket for driving said rake.

10. A snow plow having in combination, a frame, a conveyor, an impeller at one end of said conveyor to which said conveyor delivers, a shaft on which said impeller is journalled, a plate at one side of said impeller, a motor mounted on said frame at one side of said plate, a shaft driven by said motor, a second shaft splined to said shaft to be rotated thereby and so as to be movable longitudinally thereof, a pinion secured to said second shaft, a housing secured to one side of said plate enclosing said pinion, a bearing in said housing for said second shaft, a gear driven by said pinion and disposed in said housing, a shaft supported by said plate and secured to and driven by said gear, gearing connecting said gear and impeller and gearing connecting said impeller and conveyor.

11. A snow plow having in combination, a housing having a chamber therein and a chute extending upwardly from said chamber, said chamber having an opening at its outer end, a conveyor extending from the inner end of said chamber and adapted to deliver snow thereto, an impeller in said chamber for discharging snow through said chute comprising a plate at one end of said chamber forming a closure for said opening, and circumferentially spaced blades secured to the inner side of said plate and extending inwardly therefrom, and a shaft mounted in said housing on which said impeller rotates.

12. The structure set forth in claim 11, a gear secured to said impeller adjacent said plate, a pinion meshing with said gear, a second shaft secured to said pinion extending parallel to said first mentioned shaft, said shafts, gear and pinion being disposed within said blades at one side of said plate, and means for driving said second shaft.

13. A snow plow having in combination, a housing having a chamber therein and a chute extending upwardly from said chamber, a conveyor extending from one end of said chamber and adapted to deliver snow thereto, an impeller in said chamber for discharging snow through said chute comprising a plate at the other end of said chamber forming a closure for said latter end, and circumferentially spaced blades secured to the inner side of said plate and extending inwardly therefrom, said blades having substantially horizontally inner edges spaced from the axis of said impeller, a gear casing disposed within said impeller at one side of said plate and having a wall disposed close to said edges, a central shaft journaled in said casing on which said impeller rotates, and gearing in said casing for driving said impeller.

JOHN R. RITCHIE.

REFERENCES CITED

The following references are of record in the file of this patent:

UNITED STATES PATENTS

| Number | Name | Date |
| --- | --- | --- |
| 1,569,531 | Barry | Jan. 12, 1926 |
| 1,879,315 | Klauer et al. | Sept. 27, 1932 |
| 2,103,510 | Brown | Dec. 28, 1937 |
| 2,144,316 | Klauer | Jan. 17, 1939 |
| 2,223,372 | Klauer | Dec. 3, 1940 |
| 2,269,326 | Wandscheer | Jan. 6, 1942 |
| 2,281,289 | Hewitt | Apr. 28, 1942 |
| 2,337,108 | Jensen | Dec. 21, 1943 |
| 2,353,928 | Piltz | July 18, 1944 |

FOREIGN PATENTS

| Number | Country | Date |
| --- | --- | --- |
| 606,865 | France | June 22, 1926 |